US009885776B2

(12) United States Patent
Newton et al.

(10) Patent No.: US 9,885,776 B2
(45) Date of Patent: Feb. 6, 2018

(54) ELECTRONIC ENHANCED RECEIVER SCHEDULER SYSTEM

(71) Applicant: Raytheon Company, Waltham, MA (US)

(72) Inventors: Scott M. Newton, Goleta, CA (US); Joel Van Sickel, Brighton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 271 days.

(21) Appl. No.: 14/812,211

(22) Filed: Jul. 29, 2015

(65) Prior Publication Data

US 2017/0031002 A1 Feb. 2, 2017

(51) Int. Cl.
*G01S 7/02* (2006.01)

(52) U.S. Cl.
CPC .................................... *G01S 7/021* (2013.01)

(58) Field of Classification Search
CPC ........................................................ G01S 7/021
USPC ........................................................ 342/2, 20
See application file for complete search history.

(56) References Cited

U.S. PATENT DOCUMENTS

2004/0130478 A1 7/2004 Gounalis
2005/0052312 A1 3/2005 Bricker et al.
2016/0068103 A1* 3/2016 McNew .................. B60Q 9/00 701/23
2016/0231416 A1* 8/2016 Glaude .................. G01S 7/021

FOREIGN PATENT DOCUMENTS

EP 2151923 A1 2/2010
EP 2662701 A1 11/2013
FR 3011703 A1 * 4/2015 ............. G01S 7/021

OTHER PUBLICATIONS

Clarkson et al., "Performance limits of sensor scheduling strategies in electronic support", IEEE Trans. Aerosp. Electron. Syst., 2007, 43, pp. 645-650.
Winsor et al., "Optimisation and evaluation of receiver search strategies for electronic support", IET Radar Sonar Navig, 2012, 6, pp. 233-400.
PCT International Search Report and Written Opinion of the International Searching Authority, or the Declaration for International Application No. PCT/US2016/034934, Jan. 9, 2017, 16 pages.

(Continued)

*Primary Examiner* — Tashiana Adams
*Assistant Examiner* — Helena Seraydaryan
(74) *Attorney, Agent, or Firm* — Cantor Colburn LLP

(57) ABSTRACT

A radar warning receiver system includes an electronic radar receiver unit configured to generate at least one excitation pulse. The at least one excitation pulse initializes at least one antenna during a respective dwell time to receive at least one radar wave output by an active emitter of an active threat object. An electronic enhanced receiver scheduler unit includes a microcontroller configured to determine at least two threat objects from a plurality of possible threat objects. The microcontroller generates at least one enhanced hybrid pattern including a series of non-continuous dwell times respective to each of the at least two determined threat objects. The radar receiver unit generates the at least one excitation pulse according to the enhanced pattern so as to detect the at least two determined threat objects.

19 Claims, 10 Drawing Sheets

100 104 102 106 108 110 116 112 114 118

(56) References Cited

OTHER PUBLICATIONS

Vaughan L. Clarkson et al., "Number/Theoretic Solutions to Intercept Time Problems", IEEE Transactions on Information Theory, IEEE Press, USA, vol. 42, No. 3, May 1, 1996, 13 pages.

Vaughan L. Clarkson I, "Optimisation of Periodic Search Strategies for Electronic Support", IEEE Transactions on Aerospace and Electronic Systems, IEEE Service Center, Piscataway, NJ, US, vol. 47, No. 3, Jul. 1, 2011, pp. 1770-1784.

* cited by examiner

ELECTRONIC ENHANCED RECEIVER SCHEDULER SYSTEM

GOVERNMENT LICENSE RIGHTS

This invention was made with Government support under N68936-09-C-0029 awarded by the Navy. The Government has certain rights in the invention.

BACKGROUND

The present disclosure relates to electronic radar systems, and more particularly, to electronic radar warning systems.

Radar warning receiver (RWR) systems typically employ a standard comb look strategy to detect radar waves generated by scanning emitters of incoming active threats. A comb look pattern is a sequence of two or more identical dwell times spaced at a specific interval. The generated comb look pattern, however, must take into account one or more schedule budget constraints of the radar warning receiver system. The budget constraints include, for example, the minimum off-time (e.g., blanking budget) of the RWR emitter jammers. Thus, the duration of the dwell times in a hybrid comb pattern can be increased so long as dwell times do not exceed the blanking budget.

In order to optimize schedule budget usage, two or more dwell times are merged together to generate a hybrid comb look pattern. The hybrid merges are created by increasing the durations of the dwells in the comb look pattern to cover dwell times necessary to detect additional threats. Hybrid comb look patterns improve budget usage as intended, but are not optimal. For instance, many cases do not require that all the dwell times be modified in order to retain the desired Percentage of Intercept (POI). The standard definition of a comb look, however, requires that each and every dwell time in the comb look pattern must be modified if any dwell time is adjusted. Consequently, the conventional hybrid comb look strategy unnecessarily increases each and every dwell time within the comb pattern, thereby wasting duty factor usage.

SUMMARY

According to one embodiment, a radar warning receiver system includes an electronic radar receiver unit configured to generate at least one excitation pulse that initializes at least one antenna during a respective dwell time. During each dwell time, at least one radar wave output by an active emitter of an active threat object is received by the at least one antenna. The radar warning receiver system further includes an electronic enhanced receiver scheduler unit including a microcontroller that determines at least two threat objects from a plurality of possible threat objects. The radar warning receiver system generates at least one enhanced hybrid pattern including a series of non-continuous dwell times respective to each of the at least two determined threat objects. The radar receiver unit is further configured to generate the at least one excitation pulse according to the enhanced pattern so as to detect the at least two determined threat objects.

According to another embodiment, a method of generating at least one enhanced hybrid pattern configured to control a radar warning receiver system comprises determining at least two threat objects from a plurality of possible threat objects. The method further comprises generating the at least one enhanced hybrid pattern including a series of non-continuous dwell times respective to each of the at least two determined threat objects. The method further comprises generating at least one excitation pulse according to the enhanced pattern so as to initialize at least one antenna of the radar warning receiver system during the non-continuous dwell times to detect at least one radar wave output by an active emitter of the determined at least two threat objects.

Additional features are realized through the techniques of the present invention. Other embodiments and aspects of the invention are described in detail herein and are considered a part of the claimed invention. For a better understanding of the various embodiments and features of the invention, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
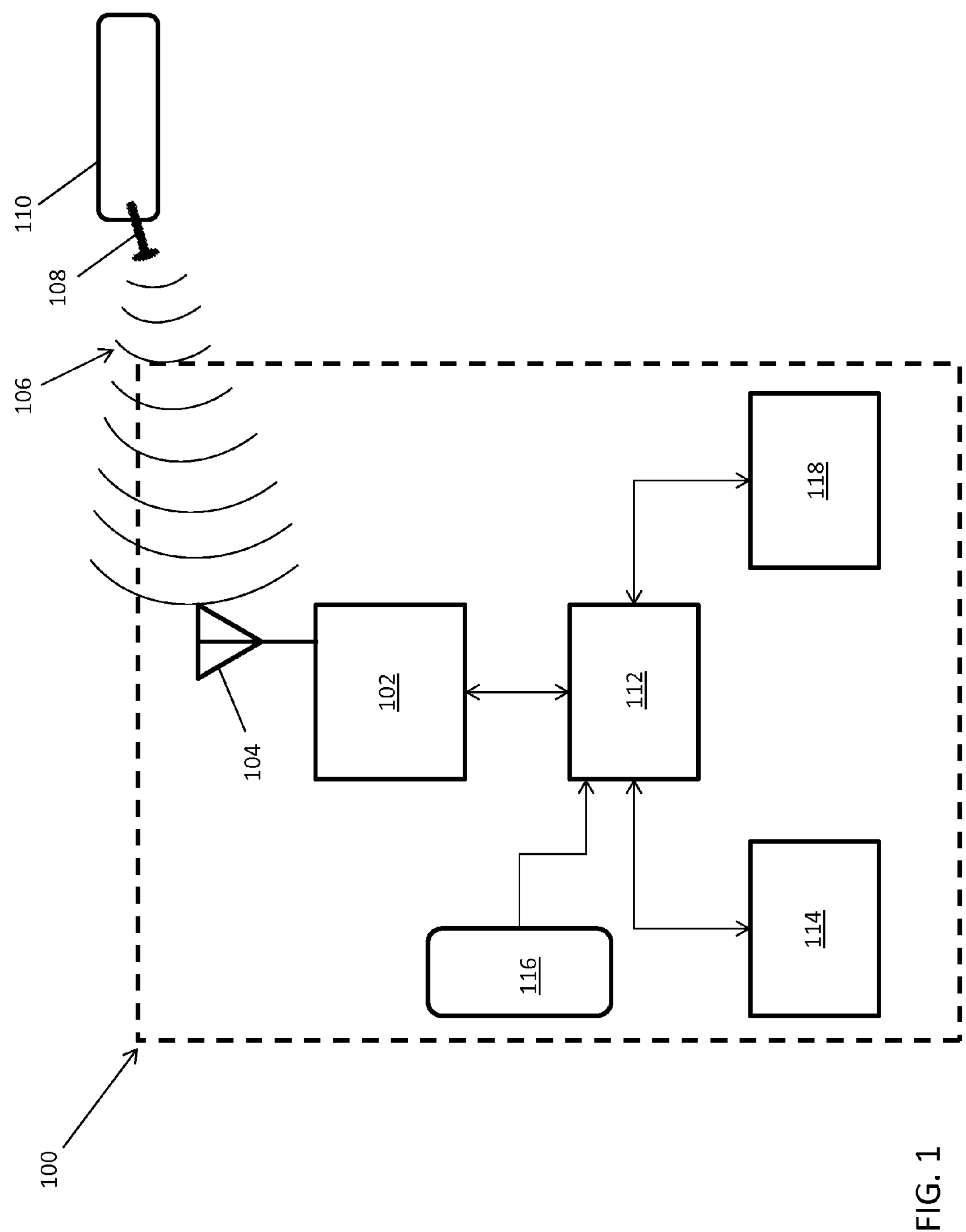
FIG. 1 is a block diagram of a RWR system according to a non-limiting embodiment.

Various embodiments of the disclosure provide an enhanced radar warning receiving (RWR) system that employs Enhanced Hybrid Patterns (EHPs) which eliminate comb looks and/or merged comb looks, and consider all dwell times as single independent elements. Additional parameters such as minimum emitter dwell time (Tmin), priority data associated with each emitter threat, and/or system budget constraints (e.g., radar jamming times or off times) can be incorporated which indicate how to link the scheduling of the dwell times and generate the EHPs. According, each dwell time is considered separately such that no dwells are unnecessarily increased in duration. The EHPs, therefore, lead to more optimal duty factor usage while retaining the same POI. That is, removing comb looks and/or merged dwell times, and considering each dwell as a separate entity allows the scheduler to better optimize the duration and scheduling of each dwell time, thereby improving the duty factor efficiency of the enhanced (RWR) system.

According to at least one non-limiting embodiment, an enhanced RWR system is provided that is configured to generate one or more enhanced patterns which schedule dwell times in a manner that utilizes the blanking budgets of the RWR jammers more efficiently. Unlike conventional RWR systems which include schedulers that increase the duration of each and every dwell time in order to generate a hybrid comb look pattern, the enhanced RWR system includes an enhanced receiver scheduler unit configured to determine at least two threat objects from a plurality of possible threat objects and to generate at least one enhanced hybrid pattern including a series of non-continuous dwell times respective to each of the at least two determined threat objects. Thus, the enhanced hybrid pattern generated by the enhanced RWR includes dwell times for each and every determined threat object, whereas the conventional RWR systems requires generating multiple different hybrid comb look patterns to address all the desired looks due to restrictions of the jammer blanking budgets.

For example, three different threat objects may have three different dwell times, respectively. The dwell times of each threat object are predetermined, for example. Accordingly, the duration necessary for initializing an antenna to detect each desired threat object can be determined. As previously mentioned, the standard definition of a comb look pattern requires that each and every dwell time in the comb look pattern must be modified if any dwell time is adjusted, all three dwell times in the hybrid look pattern. Thus, merging together the dwell times corresponding to all three threat patterns increases the duration of each merged dwell in the resulting hybrid comb look pattern.

This hybrid comb look pattern, however, may exceed the budget constraints, e.g., the minimum off-time (e.g., blanking budget), of the RWR emitter jammers. Therefore, the conventional RWR system is required to generate two different hybrid patterns: a first hybrid comb look pattern including merged dwell times corresponding to two of the three desired threat objects, and second comb look pattern consisting of the dwell time corresponding to the remaining third threat object, i.e., the dwell time excluded from the hybrid comb pattern. Thus, in order to detect all three desired threat objects, the conventional RWR system must operate according to different patterns, i.e., the first hybrid comb look pattern and the second comb look pattern.

Contrary to the conventional RWR system described above, the enhanced RWR system according to at least one non-limiting embodiment includes an electronic enhanced receiver scheduler unit capable of generating an enhanced pattern that includes the dwell times of all three threat objects without exceeding the budget constraints of the system. Instead of merging together multiple dwell patterns which can exceed the budget constraints of the system, the enhanced receiver scheduler unit generates the enhanced pattern by first scheduling the dwell time having the largest minimum dwell time, and then continuously rescheduling the ready time (Tready) of the dwell times of the remaining threat objects without necessarily modifying the duration of the dwell times. In this manner, the standard comb look requirement (e.g., each and every dwell time in the comb look pattern must be modified if any dwell time is adjusted) is avoided. In this manner, the dwell times of all three threat objects can be included in a single enhanced pattern without exceeding the budget constraints of the system. The enhanced RWR system can therefore detect all three threat objects using a single enhanced pattern.

Turning now to FIG. 1, a block diagram of an enhanced RWR system 100 is illustrated according to a non-limiting embodiment. The enhanced RWR system 100 includes an electronic radar receiver unit 102 configured to initialize at least one antenna 104 during a respective dwell time to receive at least one radar wave 106 output by an emitter 108 of an active threat object 110 existing in real-time. The antenna 104 can be initialized in response to receiving one or more one excitation pulses (not shown) that initializes the antenna (e.g., allows the antenna 104 to receive the radar waves 106) during the dwell time necessary to detect the respective active or incoming threat object 110.

For example, an excitation pulse energizes the antenna 104 and allows the enhanced RWR system 100 to look for one or more active threats for the duration of the pulse. While the antenna 104 is initialized, the antenna 104 is capable of receiving radar waves 106 generated by a respective emitter 108 of an incoming or active threat 110. In this manner, the emitter radar waves can be utilized by the enhanced RWR system 100 to detect the incoming active threat. Therefore, the excitation pulses can be generated according to an enhanced hybrid pattern. More specifically, the enhanced hybrid pattern includes a series of non-continuous dwell times that correspond to a respective threat object to be detected. In this manner, the radar receiver unit generates one or more excitation pulses according to the enhanced pattern so as to detect the desired threat object.

The enhanced RWR system 100 also includes one or more jammers (not shown) that generate countermeasure radar waves which interfere with the operation of active threat object's emitter 108. The countermeasure radar waves, however, typically interrupt not only the emitter 108 of the active threat object 110, but also the antenna 104. This tradeoff requires that the antenna 104 be switched off while the jammers are initialized, and vice versa. In order for the jammers to maintain their effectiveness, they may only be switched off (e.g., blanked) for a minimum time period before requiring re-initialization. The minimum off-time of jammers therefore introduces a budget constraint (e.g., blanking budget time) on the system 100. Accordingly, the excitation pulses must be generated such that the antenna 104 is initialized to detect the active incoming threat objects 110, while taking into account the budget constraints, e.g., a blanking budget time, of the system 100.

The enhanced RWR system 100 further includes an electronic enhanced receiver scheduler 112 in signal communication with the radar receiver unit 102. The enhanced receiver scheduler 112 is configured to determine at least two threat objects from a plurality of possible threat objects. Once the threat objects are determined, the enhanced receiver scheduler 112 is configured to generate an enhanced hybrid pattern including a series of non-continuous dwell times respective to each of the determined threat objects. Accordingly, the radar receiver unit 102 generates an excitation pulse according to the enhanced pattern so as to detect each of the determined threat objects. That is, unlike conventional hybrid comb look schedulers which typically must generate multiple different hybrid comb look patterns to detect each desired threat object, the enhanced receiver scheduler 112 can generate only a single enhanced hybrid pattern capable of selectively initializing the antenna 104 in a manner so as to detect all desired threat objects, without compromising the budget constraints (e.g., the blanking budget time) of the system 100. Although a single enhanced hybrid pattern is mentioned above, it should be appreciated that the single enhanced hybrid pattern can be continuously repeated.

The enhanced receiver scheduler 112 can determine possible threats to be included in a single enhanced hybrid pattern based on threat data contained in a threat database 114 and/or input via a graphic user interface 116. More specifically, a threat database 114 stores one or more threat object entries. Each threat object entry provides information corresponding to a possible threat object including, but not limited to, identification information of a corresponding possible threat object, a respective minimum dwell time to detect the emitter of the possible threat object, a frequency or frequency range at which to look for the possible threat object, a priority value of the possible threat object, and a probability of interception (POI) rating. According to an embodiment, the enhanced receiver scheduler 112 receives threat data input via GUI 116 indicating one or more desired threat objects to be included in an enhanced hybrid pattern, and retrieves the corresponding threat entry of each desired threat object. For example, a user of the GUI 116 can input a desire to generate an enhanced hybrid pattern capable of detecting threat objects having a particular priority value. Based on the input priority level, the enhanced receiver scheduler 112 determines the minimum dwell times of each possible threat object having a priority value that matches the input priority, and automatically generates a corresponding enhanced hybrid pattern.

The enhanced RWR system 100 further includes an electronic budget constraint unit 118 in signal communication with the electronic enhanced receiver scheduler 112. The budget constrain unit 118 is configured to provide information indicating various constraints of the enhanced RWR system 100. The constraints of the enhanced RWR system 100 include, but are not limited to, a blanking budget time of one or more jammers, a budget time period indicating a maximum period during which the radar receiver unit can initialized with respect to the blanking budget time, the number of jammers included in the enhanced RWR system 100, the operational frequency of each jammer, and the duty factor budget for each jammer.

According to a non-limiting embodiment, the enhanced receiver scheduler 112 generates an enhanced hybrid pattern based on threat object data input via the GUI 116, the threat object entries stored in the threat database 114 and/or the constraints provided by the budget constraint unit 118. For example, the enhanced receiver scheduler 112 can receive input data from the GUI 116 indicating various desired threat objects to be included in a single enhanced hybrid pattern, and then receive budget constraint information, e.g., a blanking budget time of one or more jammers, from the budget constrain unit 118. The enhanced receiver scheduler 112 then generates an enhanced hybrid pattern that contains as many of the input desired threat objects as possible without violating the blanking budget time. Threat objects having a low priority (e.g., falling below a priority threshold) that would cause the enhanced hybrid pattern to exceed the blanking budget time can be excluded. The resulting enhanced hybrid pattern therefore maximizes the number of threat objects that can be detected, while taking into account the constraints of the overall enhanced RWR system 100. The enhanced receiver scheduler 112 is also afforded an increased opportunity to schedule more dwell times that can then improve the percent of intercept (POI) of the possible threat objects which leads to more efficient use of the duty factor.

Figure 2:
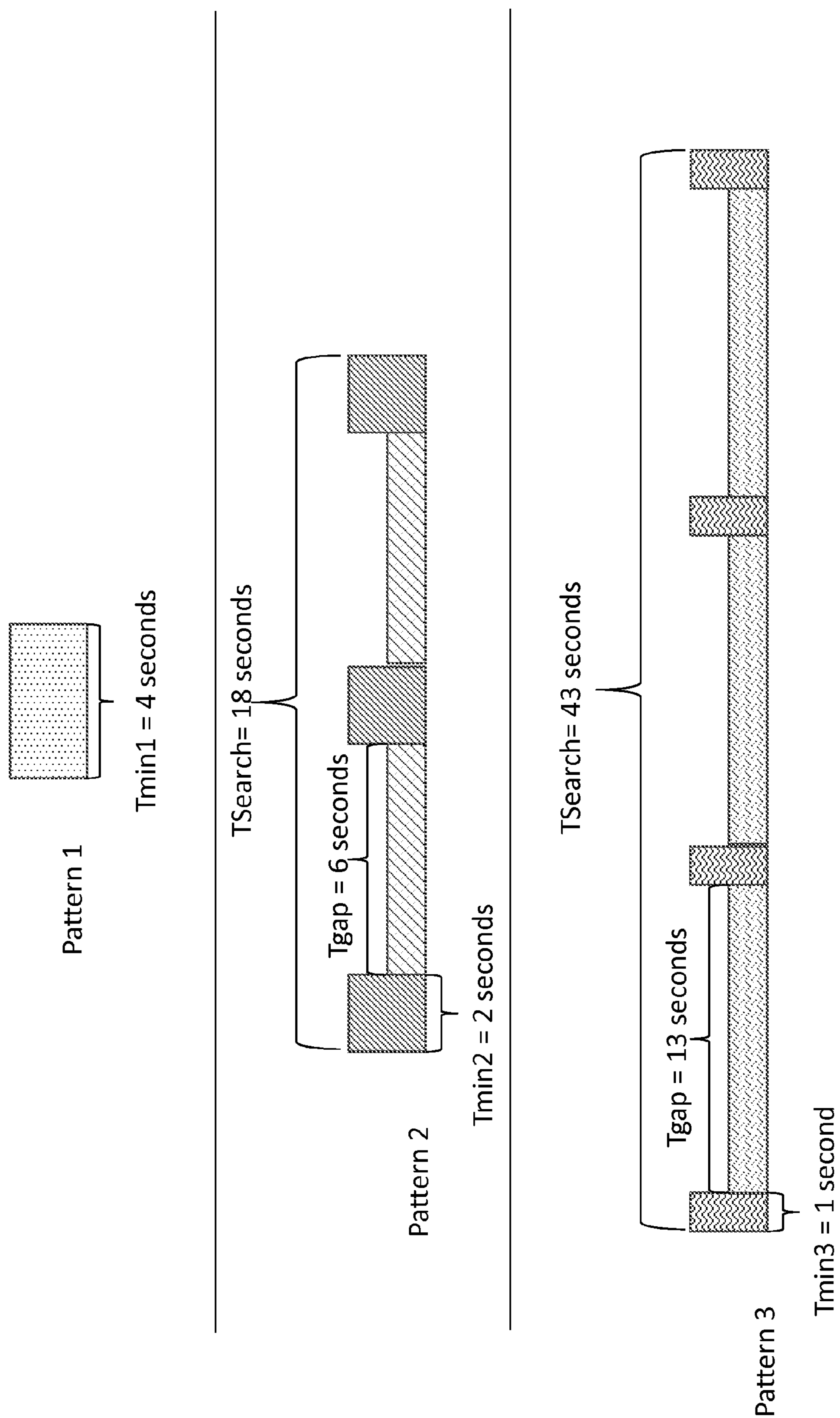
FIGS. 2-7 are a series of diagrams illustrating a process of generating an enhanced hybrid pattern according to a non-limiting embodiment.

Turning now to FIGS. 2-7, a series of diagrams illustrates a process of generating an enhanced hybrid pattern according to a non-limiting embodiment. With reference to FIG. 2, three different timing patterns (Pattern1-Pattern3) are illustrated. The timing patterns correspond to a respective desired threat object to be detected by the enhanced RWR system 100. Each timing pattern includes one or more dwell times during which an active emitter of the desired threat object can be detected as discussed in detail above. Accordingly, a final enhanced hybrid pattern will include each timing pattern (Pattern 1-Pattern 3) arranged as series of non-continuous dwell times.

For example, Pattern 1 is a non-intermittent pattern corresponding to an emitter of a first threat object to be detected, and is defined by a single dwell time, i.e., a single dwell (DT1). The minimum dwell time ($T_{min}$) of DT1 is 4 seconds. That is, an antenna 104 of the enhanced RWR system 100 will need to be initialized for a minimum of 4 seconds to detect the radar wave pattern generated by an active emitter the first threat object. Pattern 2 is an intermittent pattern corresponding to an emitter of a second threat object to be detected. Unlike Pattern 1, Pattern 2 is defined by a three intermittent dwell times generated 6 seconds apart ($T_{gap}$). The minimum duration ($T_{min}$) of each dwell time of Pattern2 is 2 seconds. Accordingly, an initialized antenna 104 will need a minimum of 18 seconds, called $T_{Search2}$, (2 seconds+6 seconds+2 seconds=10 seconds) to detect the radar wave pattern generated by an active emitter the second threat object. A dwell time indicates the time sliver that the antenna must be active to detect a threat object if its emitter is actively emitting radar waves. The search time represents the time period for which dwells must be repeated in order to guarantee the threat is detected since some threats are not emitting continuously. Pattern 3 is an intermittent pattern corresponding to an emitter of a third threat object to be detected. Pattern 3 is defined by four intermittent dwell times generated 13 seconds apart ($T_{gap}$). The minimum duration ($T_{min}$) of each dwell time of Pattern3 is 1 second. Accordingly, an initialized antenna 104 will need a minimum of 43 seconds, Tsearch3, (1 seconds+13 seconds+1 seconds=15 seconds) to detect the radar wave pattern generated by an active emitter the third threat object.

Figure 3:
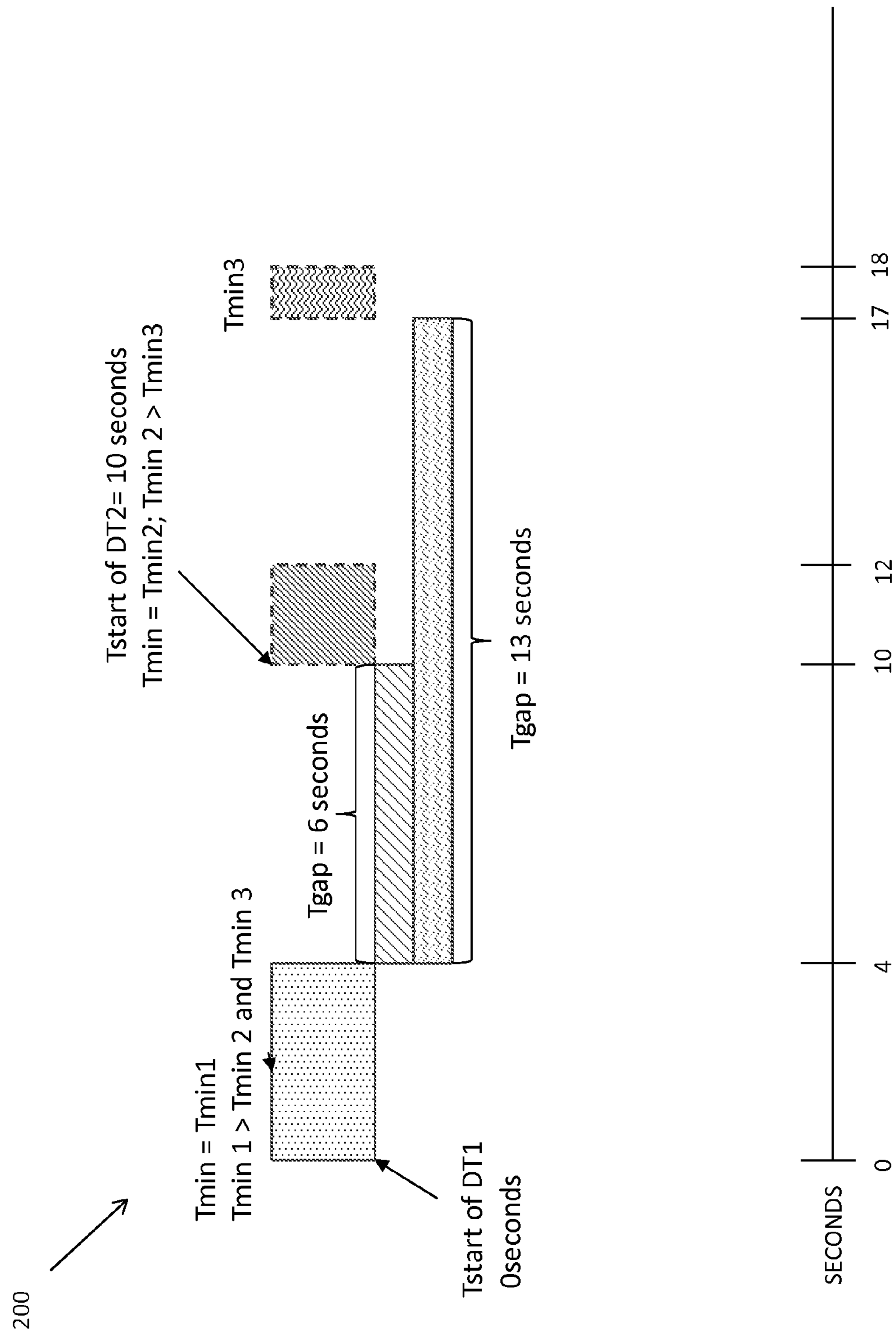

Referring to FIG. 3, an enhanced hybrid pattern 200 is generated by first inserting the pattern having the greatest $T_{min}$ at T=0 seconds. In this non-limiting example, the enhanced receiver scheduler 112 selects Pattern 1 as the initial dwell time inserted at T=0 seconds, since $T_{min}$ (4 seconds) of Pattern 1 is greater than Tmin (2 seconds) of Pattern 2 and $T_{min}$ (1 second) of Pattern 3. Since the initial pattern is selected based on the condition of having the largest $T_{min}$ among all the desired threat objects to be included in the final enhanced hybrid pattern, final enhanced hybrid pattern will include at least one unmodified first non-continuous dwell time. That is, at least one dwell time included in the final enhanced hybrid pattern will have a duration equal to the $T_{min}$ indicated by the threat database.

The start times for the remaining timing patterns (Pattern 2 and Pattern 3) must now be updated taking into account the end time ($T_{end}$) of the initial pattern (e.g., Pattern 1), the minimum dwell times of the remaining patterns, and the time gaps ($T_{gap}$) of each remaining pattern. As further illustrated in FIG. 3, Pattern 2 (if selected next) will begin at T=10 seconds, while Pattern 3 (if selected) will begin at T=17 seconds.

Figure 4:
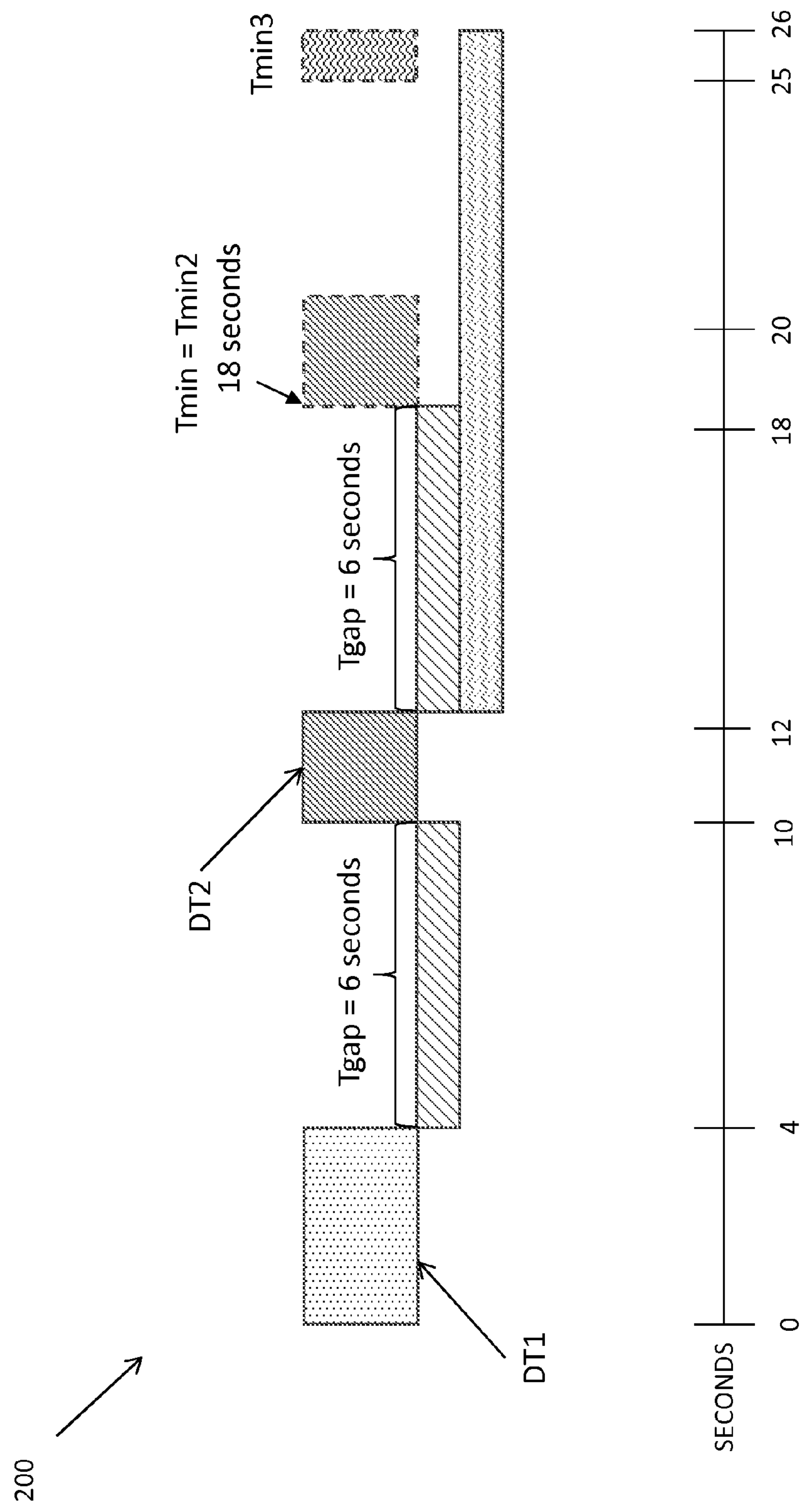

Turning to FIG. 4, the enhanced receiver scheduler 112 compares Tmin of the remaining dwell times, and selects the timing pattern having the next greatest Tmin, which in this case, for example, is Pattern 2 (e.g., 2 seconds). As discussed above, Pattern 2 is an intermittent pattern including two dwell times (e.g., 2 seconds) separated by a Tgap (e.g., 6 seconds). Accordingly, the enhanced receiver scheduler 112 inserts the second dwell time (DT2) with a Tmin equal to Tmin2 from Pattern 2 at the next ready time (e.g., T=10 seconds), taking into account Tend of Dwell1 (e.g., Pattern 1=4 seconds) and Tgap of the next timing pattern (e.g., Pattern 2=6 seconds). The third dwell time (DT3) is then inserted at 18 seconds, taking into account $T_{end\ of\ DWell2}$ (e.g., 12 seconds) and Tgap of Pattern 2 (e.g., 6 seconds). The third dwell time DT3 covers the Tsearch of 18 for pattern 2, so now only Pattern 3 must be detected. Following the insertion of the last dwell time (e.g., DT3), the start times for the remaining timing patterns (e.g., Pattern 3) are again updated taking into account the end time (Tend) of the most recently inserted dwell (e.g., DT3), the minimum dwell times of the remaining patterns, and the time gaps ($T_{gap}$) of each remaining pattern.

Figure 5:
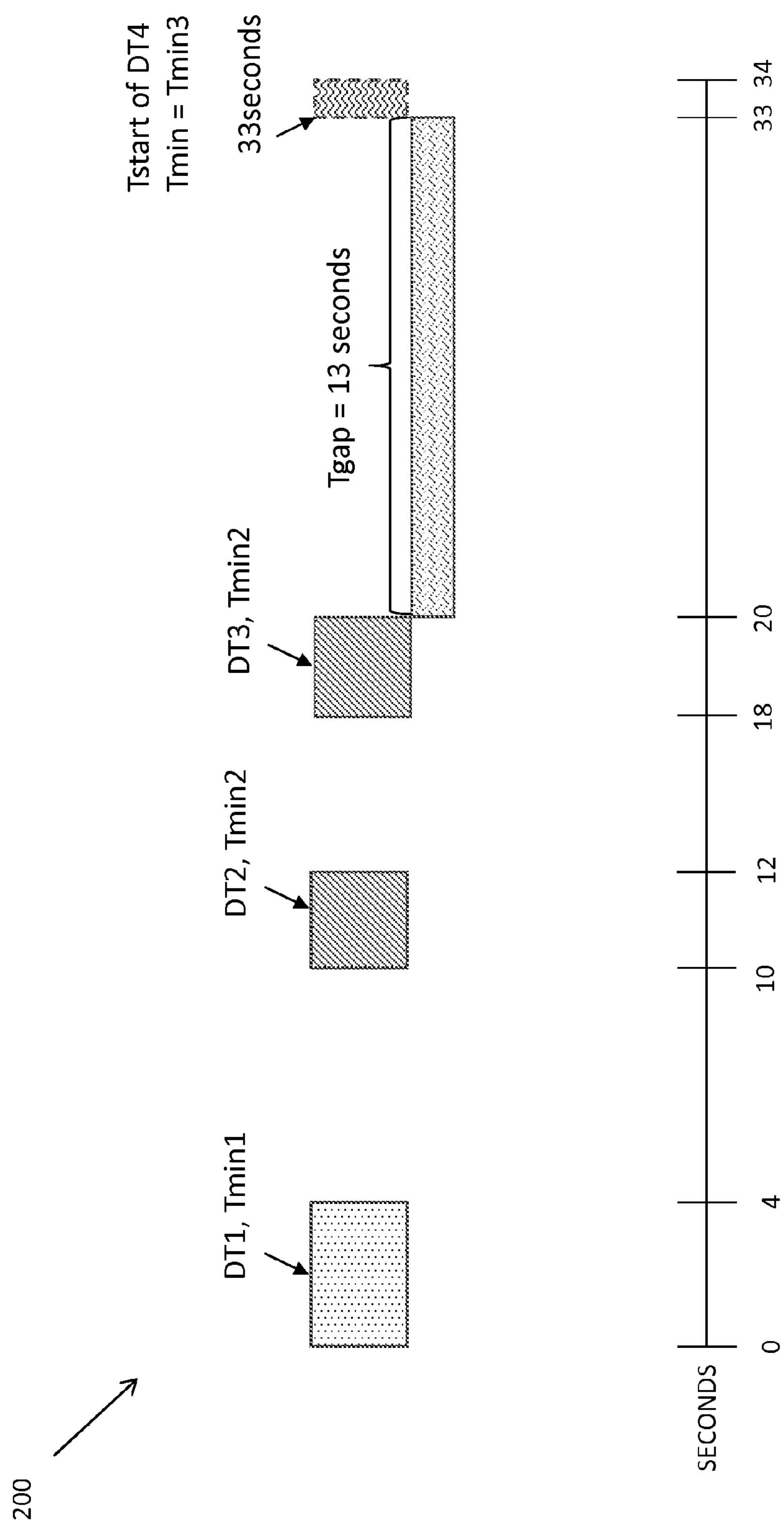

Referring now to FIG. 5, the enhanced receiver scheduler 112 determines that Pattern 3 is the last remaining time pattern needed to complete the enhanced hybrid pattern 200, and begins inserting Pattern 3 accordingly. As discussed above, Pattern 3 is an intermittent pattern including two dwell times (e.g., 1 seconds) separated by a $T_{gap}$ (e.g., 13 seconds). Accordingly, the enhanced receiver scheduler 112 inserts the next dwell time (DT4) with Tmin equal to Tmin3 (e.g., T=33 seconds) taking into account Tend of the most recent inserted dwell time (e.g., DT3=20 seconds) and Tgap of the next timing pattern (e.g., Pattern 3=13 seconds).

Figure 6:
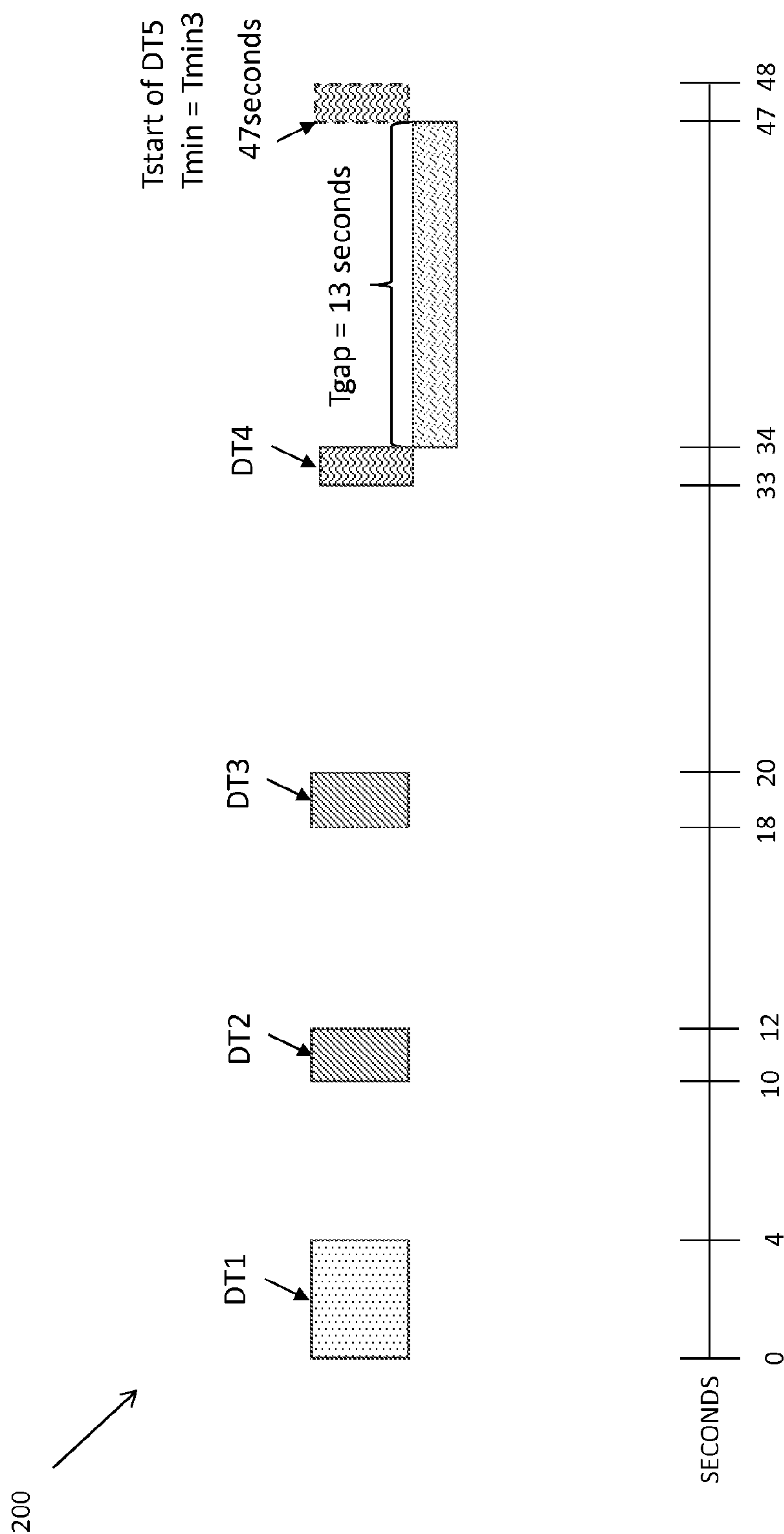
Figure 7:
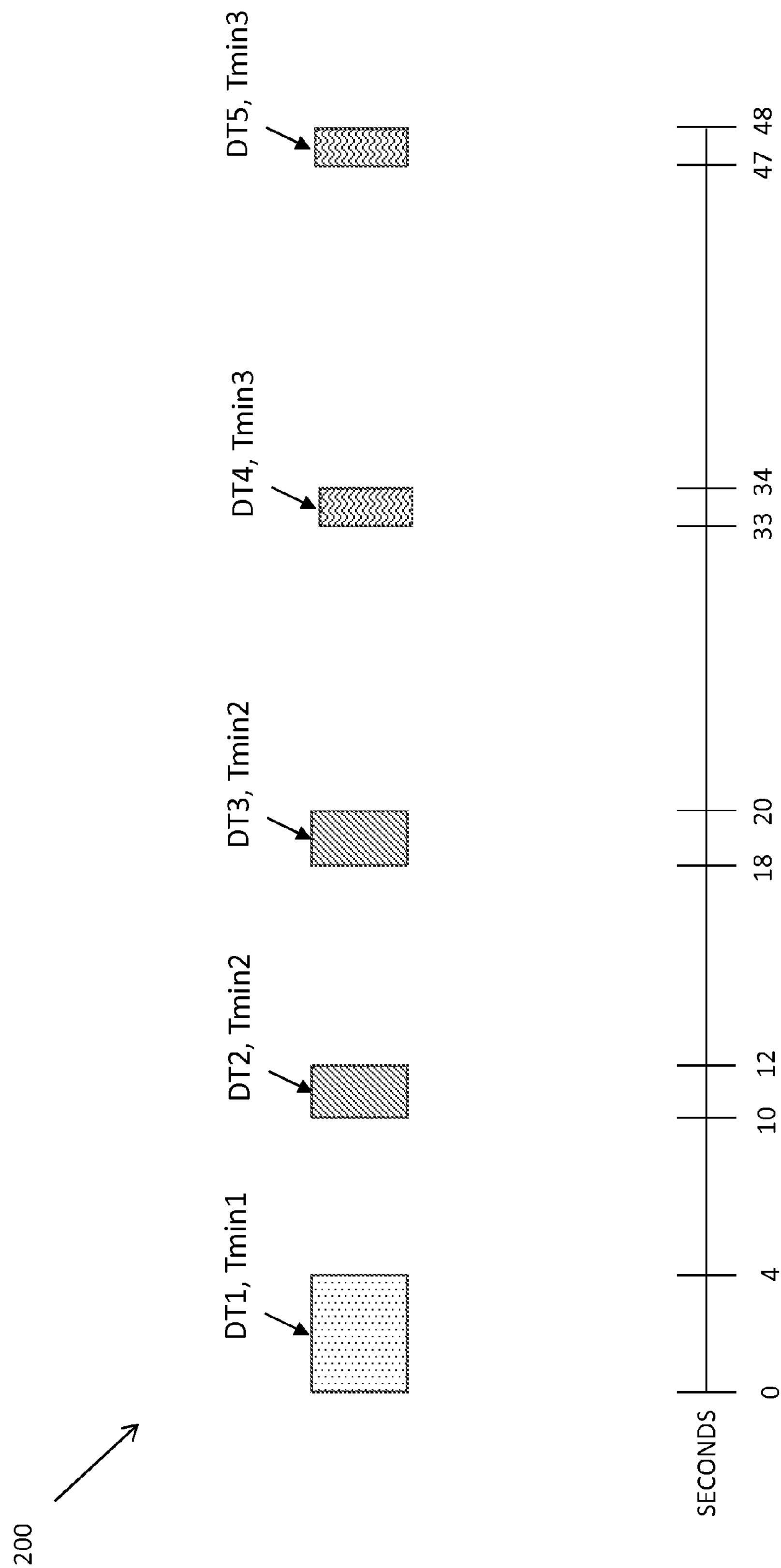

Turning now to FIG. 6, enhanced receiver scheduler 112 inserts the next dwell time (DT5) with Tmin equal to Tmin33 at T=47 seconds, taking into account Tend of DT4 (e.g., 34 seconds) and Tgap of Pattern 3 (e.g., 13 seconds). Following the insertion of the last dwell time (e.g., DT3B), the final enhanced hybrid pattern 200 is generated as shown in FIG. 7. This final enhanced hybrid pattern 200 has DT5 ending at a time greater than Tsearch3, so now pattern 3 is guaranteed to be detected and all patterns are now properly covered by respective dwell times (i.e., looks).

A further illustrated in FIG. 7, the dwell times of three different desired threat objects are included in a single enhanced hybrid pattern 200, without requiring modifying the Tmin of corresponding to each threat object. For instance, a first duration (e.g., 4 seconds) of the dwell time corresponding to the first threat object is different from durations of the remaining non-continuous dwell times corresponding to the remaining different threat objects. Thus, unlike conventional hybrid comb patterns, the enhanced hybrid pattern 200 according to at least one non-limiting embodiment does not require modifying (e.g., extending the duration) every dwell time when only one dwell time requires modification. Accordingly, the antenna 104 of the enhanced RWR system 100 can be initialized according to the final enhanced hybrid pattern 200 to detect the active emitters of all three desired threat objects without violating the constrains of the overall enhanced RWR system 100.

Figure 8A:
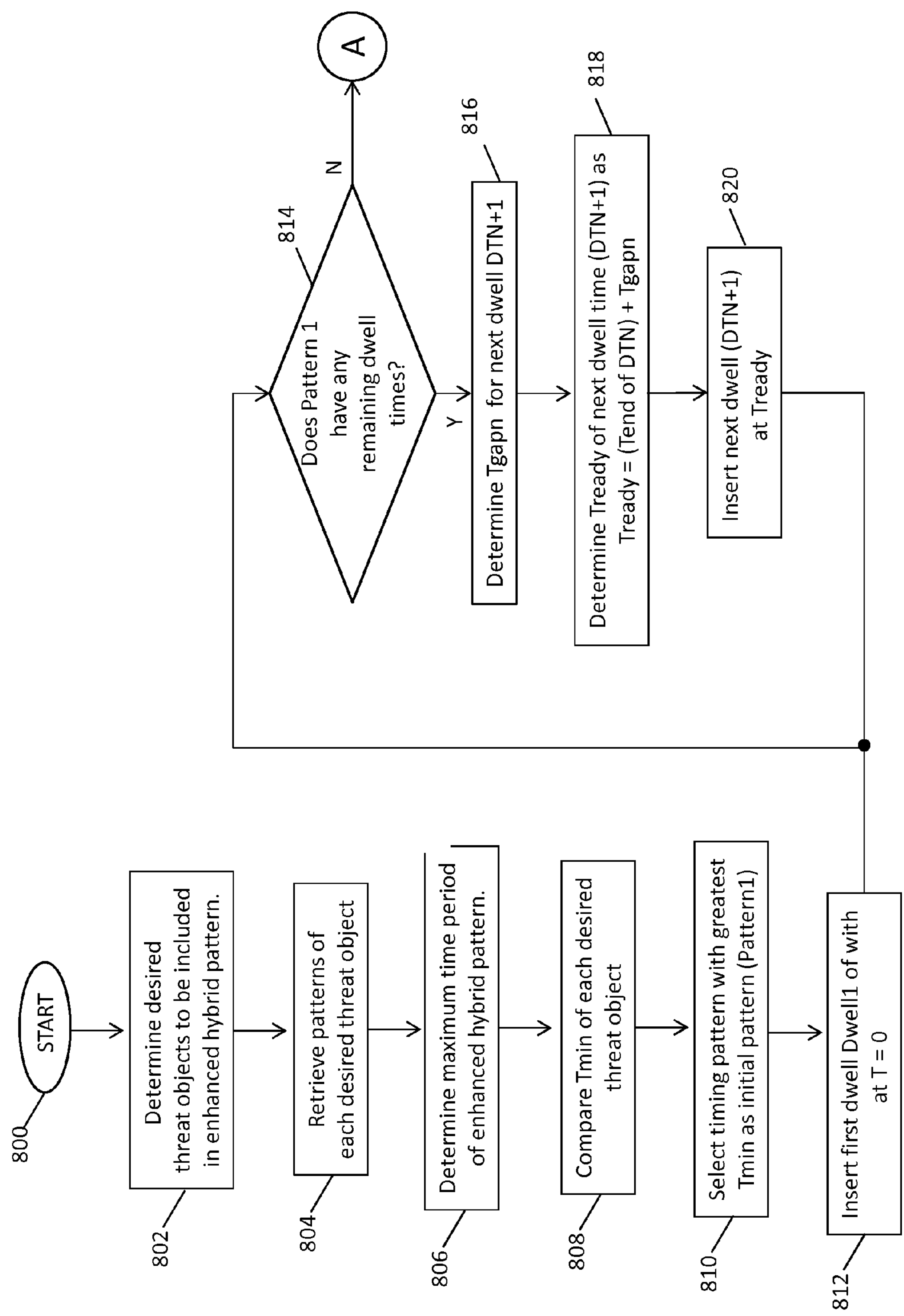
FIGS. 8A-8B are a flow diagram illustrating a method of generating an enhanced hybrid pattern according to a non-limiting embodiment.
Figure 8B:
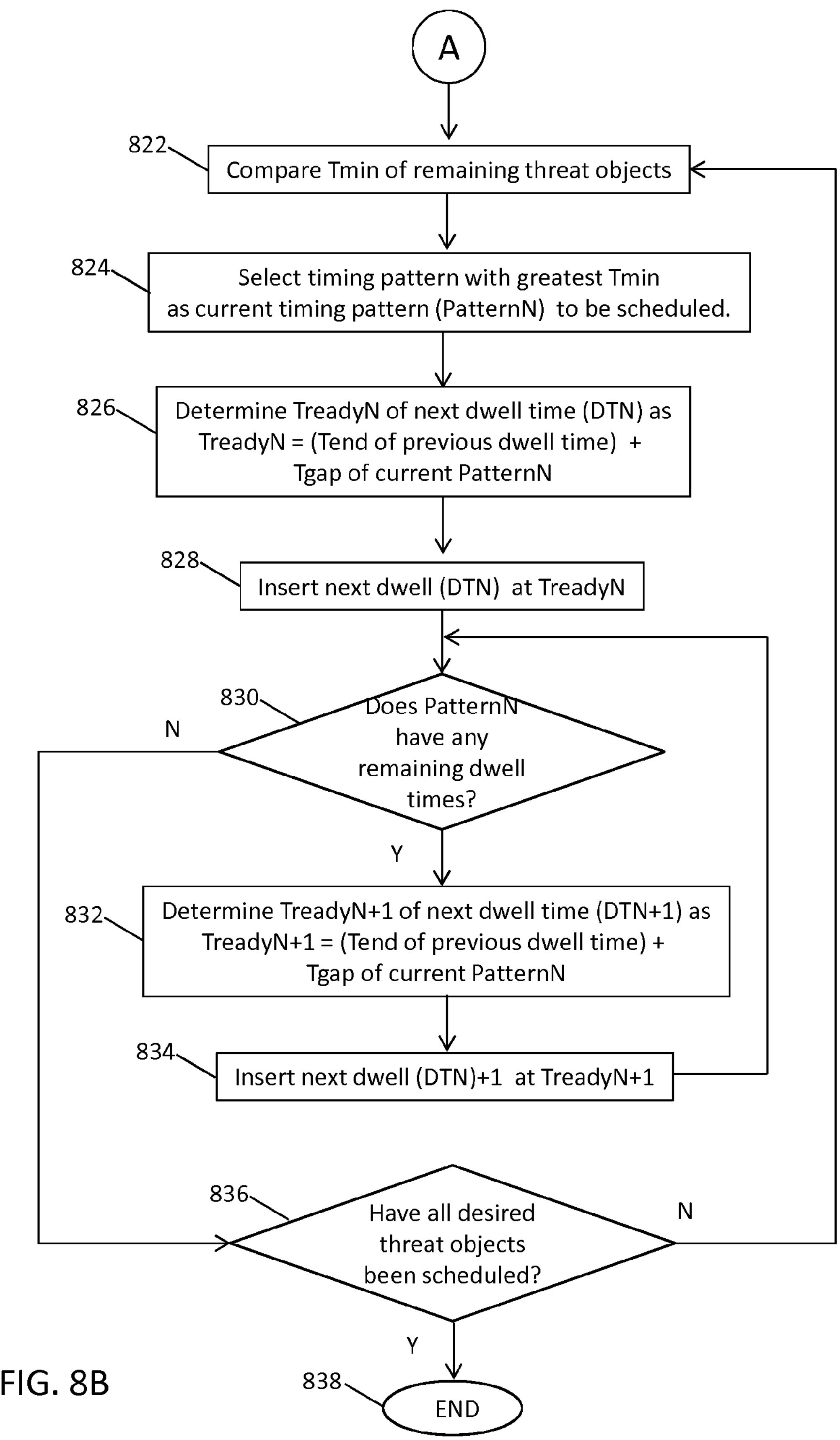

Turning now to FIGS. 8A-8B, a flow diagram illustrates a method of generating an enhanced hybrid pattern according to a non-limiting embodiment. The method begins at operation 800, and at operation a set of desired threat objects to be included in an enhanced hybrid pattern is determined. The desired threat objects can be explicitly input via a GUI, and/or can be automatically determined by an enhanced receiver scheduler based on threat object data such as, for example, a desired frequency band, priority value, etc., input via the GUI as described in detail above. At operation 804, the timing patterns of each desired threat object is retrieved from a threat database. As described above, the threat database stores threat object entries providing information such as, for example, the minimum dwell time ($T_{min}$), corresponding to each threat object. The timing patterns are essentially sub-patterns corresponding to each respective desired threat object to be detected using the completed enhanced hybrid pattern. Each timing pattern includes one or more dwell times at which to detect an active emitter of a corresponding threat object. Accordingly, the timing patterns are scheduled to form a series of non-continuous dwell times that define the overall enhanced hybrid pattern once scheduling of all the timing patterns is completed.

At operation 806, a maximum time period (TSearchMax) of the enhanced hybrid pattern for detecting all desired threat objects is determined. The (TSearchMax) is the maximum search window of the patterns involved in the EHP. If the appropriate dwell times (i.e., looks) are scheduled for this length of time, the probability of intercept (POI) for all of the patterns is 100%. At operation 808, the Tmin for each desired threat object to be included in the enhanced hybrid pattern is compared to one another. At operation 810, the timing pattern having a dwell time with the greatest Tmin is selected as the initial timing pattern to be included in the enhanced hybrid pattern. At operation 812, the first dwell time (DT1) of the initial timing pattern (Pattern1) is insert into the enhanced hybrid pattern at T=0 seconds.

Turning to operation 814, a decision is made as to whether Pattern1 has any remaining dwell times. For example, if Pattern1 is a non-intermittent pattern, no further dwell times remain. However, if Pattern1 is an intermittent pattern, one or more additional dwell times remain after inserting the first dwell time (DT1). When a remaining dwell time exists, the time period ($T_{gap1}$) between the first dwell time (DT1) and the next dwell time (DT1+1) of Pattern1 is determined at operation 816. At operation 818, the ready time (Tready) of the next dwell time (DT1+1) is determined. $T_{ready}$ of the next dwell time (DT1+1) may be calculated as: $T_{ready}=T_{end\ of\ DT1}=T_{gap1}$. At operation 820, the next dwell time (DT1+1) of Pattern1 is insert at Tready, and the method returns to operation 814 to determine whether any further dwell times of the initial pattern (Pattern1) exit.

When no further dwell times of Pattern1 exist, the method proceeds to operation 822, during which each Tmin of the remaining threat objects is compared to one another. At operation 824, the timing pattern of the threat object having the greatest Tmin is selected as the current timing pattern (i.e., PatternN) to be inserted in the enhanced hybrid pattern. At operation 826, Tready of the first dwell time (i.e., DTN) corresponding to the current pattern (i.e., PatternN) is calculated. Tready of DTN may be calculated as: $T_{ready}=T_{end}$ of the final dwell time of the initial pattern (i.e., Pattern1)+$T_{gap}$ of PatternN. At operation 828, the DTN of PatterN is inserted at Tready.

Turning to operation 830, a decision is made as to whether the current pattern (PatternN) has any remaining dwell times. If additional dwell times exist, the method proceeds to operation 832, where the next dwell time (DTN+1) of the current pattern (PatternN) is calculated. The next dwell time (DTN+1) may be calculated as: TreadyN+1=Tend of previous dwell time (DTN)+Tgap of the current pattern (PatternN). At operation 834, the next dwell pattern (DTN+1) is insert at TreadyN+1, and the method returns to operation 830 to determine if the current pattern (PatternN) includes any additional dwell times.

When no additional dwell times of the current pattern (PatternN) exist, the method proceeds to operation 836, where a decision is made as to whether all the desired threat objects have been scheduled. When all the threat objects have been scheduled, the enhanced hybrid pattern is complete and the method ends at operation 838. When, however, all the threat objects have not been scheduled, the method returns to operation 822, and the Tmins of the remaining threat objects are compared to determine the next timing pattern to be scheduled in the enhanced hybrid pattern. The method repeats the operations described in detail above until it is determined at operation 836 that all the threat objects identified at operation 802 have been scheduled, and the method ends at operation 838.

Figure 9:
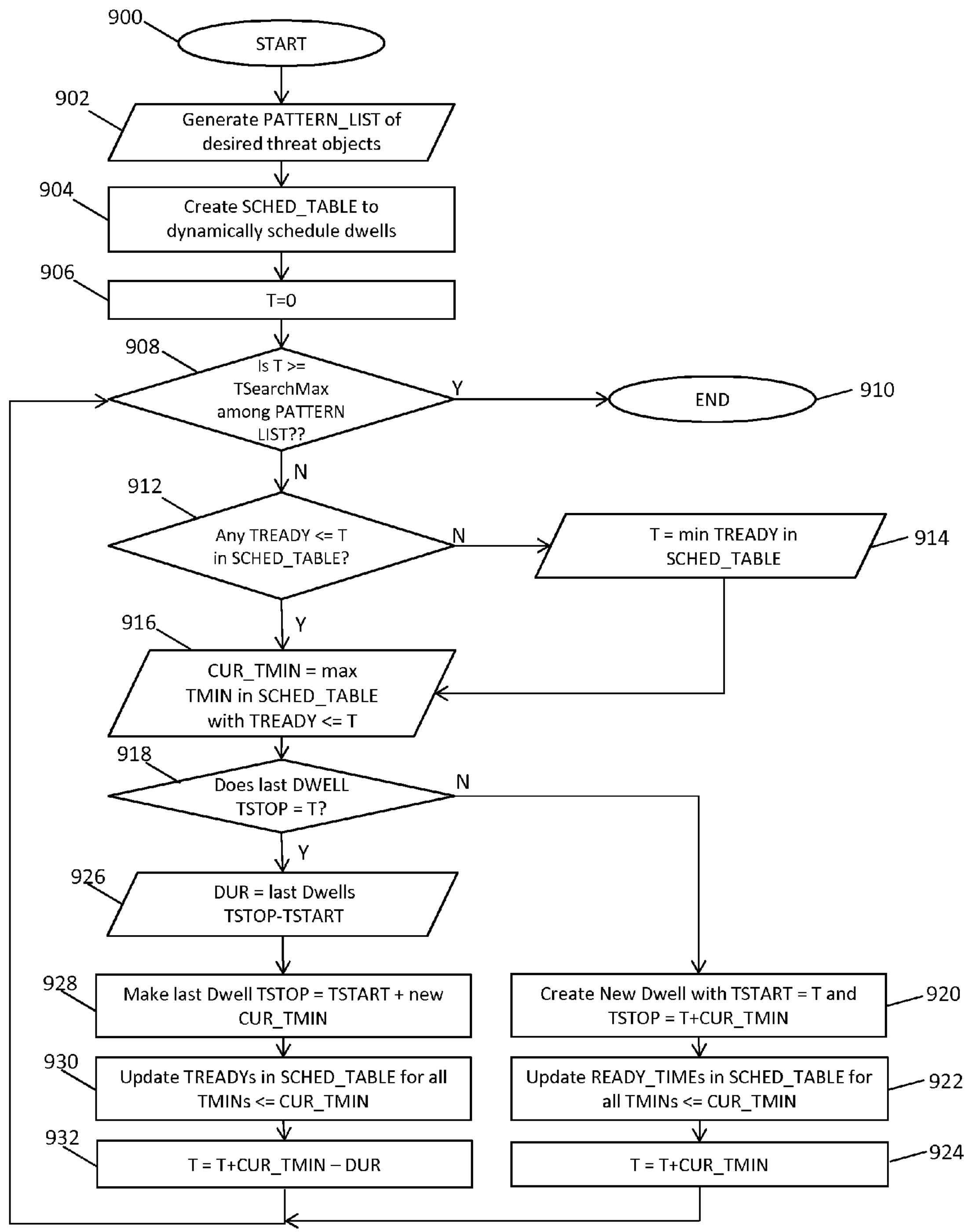
FIG. 9 is a flow diagram illustrating a method of generating an enhanced hybrid pattern according to another non-limiting embodiment.

Turning now to FIG. 9, a flow diagram illustrates a method of generating an enhanced hybrid pattern according to another non-limiting embodiment. The method begins at operation 900, and at operation 902 a pattern list (PATTERN_LIST) including the timing patterns corresponding to each respective desired threat object to be included in an enhanced hybrid pattern is generated. The desired threat objects can be explicitly input via a GUI, and/or can be automatically determined by an enhanced receiver scheduler based on threat object data such as, for example, a desired frequency band, priority value, etc., input via the GUI as described in detail above. Once the desired threat objects are determined, the timing patterns corresponding to each respective desired threat object can be determined, e.g., retrieved from the threat database or received from the GUI.

At operation 904, a schedule table is generated which is used to dynamically schedule the dwell times corresponding to each desired threat object. At operation 906, an insertion pointer is set to time=0 seconds (T=0 s). T represents the current time in seconds in the enhanced hybrid pattern at which the dwell time is being scheduled. T=0 seconds represents the beginning of the timing pattern of the initial threat object being scheduled. The T of the enhanced hybrid pattern is advanced linearly in order to determine the start time (Tstart) of each subsequent added dwell time. For instance, if at T=0 s, a dwell time of 2 seconds is scheduled, the new Tstart of the subsequent added dwell time will be referenced starting from at least at T=2 seconds. Then T will be advanced to the closest Tready, based on the minimum Tgap, and the process will be repeated. Thus, the advancement of T along the enhanced hybrid pattern essential represents the potential insertion point for each subsequent dwell times added to the enhanced hybrid pattern. According to an embodiment, the first dwell time of the initial pattern added to the enhanced hybrid pattern will be inserted at T=0 seconds. At operation 908, a decision is made to determine whether enough dwell times have been scheduled to cover the entire detection time ($T_{SearchMax}$) of all desired threat objects determined at operation 902. When T is greater than or equal to the dwell time having the greatest $T_{min}$ of the current timing pattern being scheduled, the method ends at operation 910.

Threat objects only require dwell times to be scheduled at intervals having a length equal to Tgap such that there is no need to schedule dwell times before that $T_{gap}$ time period has expired. Therefore, when T is less than the greatest $T_{SearchMax}$ of the current pattern being scheduled at operation 908, the method proceeds to operation 912 where a decision is made as to whether any threat objects require a scheduled dwell time in order to detect them (i.e., Tready less than or equal to the current scheduling time). When any $T_{ready}$ is not less than or equal to T, the method proceeds to operation 914 where T is set to the minimum Tready included in the schedule table. Thereafter, the method proceeds to operation 916, where the largest dwell time necessary to detect any of the desired threat object having a $T_{ready}$ less than or equal to T is selected as "CUR_TMIN", i.e., the expected duration of the dwell time to be scheduled.

However, when any Tready at operation 912 is less than or equal to T, the method proceeds directly to operation 916 where the largest dwell time needed to detect any of the threats with Tready less than or equal to T is selected as "CUR_TMIN," i.e., the expected width of the dwell time about to be scheduled. At operation 918, a decision is made as to whether the time of the final dwell time in the current scheduled pattern ($T_{stop}$) equals T. If this value is equal to T, the next dwell to be scheduled occurs immediately after Tstop of the previous dwell time. In this manner, an unnecessary condition of which two dwell times are scheduled directly next to each other can be detected. When $T_{stop}$ of the final dwell time of the current pattern does not equal T, the method proceeds to operation 920 where the next dwell start time ($T_{start}$) is inserted at T and the next respective stop time ($T_{stop}$) is inserted at T=$T_{start}$+CUR_TMIN. Accordingly, a subsequent dwell time is created in the schedule that detects all threat objects currently flagged with Tready less than or equal to Tmin. At operation 922, all of the threat objects that were previously flagged as having Tready less than or equal to $T_{min}$ have their $T_{ready}$ value updated and defined as $T_{stop}$+$T_{gap}$, for the respective threat object. At operation 924, the scheduling for the current dwell time is finished, and the index pointer is advanced to T+Curtmin, which also is the $T_{stop}$ of the dwell time that was most recently scheduled. After completing operation 924, the method returns to operation 908. According to an embodiment, additional dwell times having the smallest $T_{min}$ of a timing pattern may be inserted in available time gaps between dwell times of different timing patterns having larger Tmins if the budget constraints of the RWR system will not be violated.

When, however, the last Dwell $T_{stop}$ equals T, the method proceeds to operation 926 where the duration (DUR) is calculated. In this case, if another dwell time were to be scheduled immediately, it would touch (e.g., coincide or overlap) with the previously scheduled dwell time. Although the corresponding threat object can still be detected using the coinciding dwell times, the efficiency of the resulting schedule budget is not maximized.

Instead of adding a new dwell time, the duration of the previous dwell time is increased to detect all threat objects flagged as having Tready less than or equal to T. First, the $T_{start}$ and the $T_{stop}$ of the most recent dwell time that was scheduled is determined so as to calculate its duration (DUR). At operation 928, DUR is increased by redefining its $T_{stop}$ as: $T_{start}$+CUR_TMIN. At operation 930, all of the threat objects that were previously flagged as having $T_{ready}$ less than or equal to $T_{min}$ have their $T_{ready}$ value for a respective threat object redefined as: $T_{stop}$+$T_{gap}$. At operation 932, the scheduling for the current dwell time is finished, and T is advanced to T+Curtmin-DUR, which also is the $T_{stop}$ of the dwell time that was just increased to cover additional threat objects. After completing operation 932, the method returns to operation 908. Accordingly, the method continues scheduling dwell times of the threat objects included in the schedule table until T is greater than or equal to the max $T_{ready}$, and the method ends at operation 910. Although the duration of a particular dwell time may be increased from its original $T_{min}$, it should be appreciated that modifying the duration of other dwell times included in the enhanced time pattern is not required.

As described above, an enhanced RWR system is provided that is configured to generate one or more enhanced patterns which schedule dwell times in a manner that utilizes the blanking budgets of the RWR jammers more efficiently. Unlike conventional RWR systems which include schedulers that increase the duration of each and every dwell time in order to generate a hybrid comb look pattern, the enhanced RWR system includes an enhanced receiver scheduler unit configured to determine at least two threat objects from a plurality of possible threat objects and to generate at least one enhanced hybrid pattern including a series of non-continuous dwell times respective to each of the at least two determined threat objects. The enhanced hybrid pattern increases the efficiency of the spacing (e.g., 30% more spacing) used to schedule the dwell time. Thus, a single enhanced hybrid pattern can be generated which includes dwell times for each and every determined threat object without violating the budget constraints of the system, whereas the conventional RWR systems requires generating multiple different hybrid comb look patterns to address all the desired looks due to restrictions such as jammer blanking budgets.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A radar warning receiver system, comprising:

an electronic radar receiver unit configured to generate at least one excitation pulse that initializes at least one antenna during a respective dwell time to receive at least one radar wave output by an active emitter of an active threat object;

an electronic enhanced receiver scheduler unit including a microcontroller configured to determine at least two threat objects from a plurality of possible threat objects and to generate at least one enhanced hybrid pattern including a series of non-continuous dwell times respective to each of the at least two determined threat objects, a first non-continuous dwell time among the at least two determined threat objects having a first duration and at least one remaining non-continuous dwell time among the at least two threat objects having a second duration different from the first duration, wherein the radar receiver unit is configured to generate the at least one excitation pulse according to the enhanced pattern so as to detect the at least two determined threat objects, and wherein the first non-continuous dwell time is unmodified such that the first duration is equivalent to a minimum dwell time of a respective threat object.

2. The radar warning receiver system of claim 1, further comprising a threat database including a plurality of threat object entries identifying a corresponding possible threat object and the respective minimum dwell time to detect the emitter of a possible threat object entry included in the threat database.

3. The radar warning receiver system of claim 2, wherein the first duration is greater than the second duration.

4. The radar warning receiver system of claim 2, further comprising an electronic budget constraint unit including a microprocessor configured to determine a budget time period indicating a maximum period during which the radar receiver unit is initialized.

5. The radar warning receiver system of claim 4, wherein the enhanced receiver scheduler unit is in electrical communication with the budget constraint unit, and generates the enhanced hybrid pattern based on a comparison between the minimum dwell times of the at least two determined threat objects and the budget time period.

6. The radar warning receiver system of claim 5, wherein the enhanced receiver scheduler unit generates the at least one enhanced hybrid pattern based on a comparison between a first minimum dwell time of a first determined threat object and a second minimum dwell time of a second determined threat object.

7. The radar warning receiver system of claim 6, wherein the enhanced receiver scheduler unit generates the at least one enhanced hybrid pattern by setting the unmodified first non-continuous dwell time as an initial dwell time starting from time=0 seconds, and setting the at least one remaining non-continuous dwell time after the unmodified first non-continuous dwell time.

8. The radar warning receiver system of claim 7, wherein the minimum dwell time of the unmodified first non-continuous dwell time is greater than the minimum dwell time of the at least one remaining non-continuous dwell time.

9. The radar warning receiver system of claim 2, wherein the threat object entry further includes a priority value assigned to each possible threat object.

10. The radar warning receiver system of claim 9, wherein the electronic enhanced receiver scheduler unit determines the at least two threat objects from the plurality of possible threat objects based on the priority value.

11. A method of generating at least one enhanced hybrid pattern configured to control a radar warning receiver system, the method comprising:

determining at least two threat objects from a plurality of possible threat objects, a first non-continuous dwell time among the at least two determined threat objects having a first duration and at least one remaining non-continuous dwell time among the at least two threat objects having a second duration different from the first duration;

generating the at least one enhanced hybrid pattern including a series of non-continuous dwell times respective to each of the at least two determined threat objects, wherein the first non-continuous dwell time is unmodified such that the first duration is equivalent to the minimum dwell time indicated by a respective threat object entry; and generating at least one excitation pulse according to the enhanced pattern so as to initialize at least one antenna of the radar warning receiver system during the non-continuous dwell times to detect at least one radar wave output by an active emitter of the determined at least two threat objects.

12. The method of claim 11, wherein the first duration is greater than the second duration.

13. The method of claim 11, further comprising determining a budget time period indicating a maximum period during which the radar receiver unit is initialized.

14. The method of claim 13, further comprising generating the enhanced hybrid pattern based on a comparison between the minimum dwell times of the at least two determined threat objects and the budget time period.

15. The method of claim 14, further comprising generating the at least one enhanced hybrid pattern based on a comparison between a first minimum dwell time of a first determined threat object and a second minimum dwell time of a second determined threat object.

16. The method of claim 15, further comprising generating the at least one enhanced hybrid pattern by setting the unmodified first non-continuous dwell time as an initial dwell time starting from time=0 seconds, and setting the at least one remaining non-continuous dwell time after the unmodified first non-continuous dwell time.

17. The method of claim 16, wherein the minimum dwell time of the unmodified first non-continuous dwell time is greater than the minimum dwell time of the at least one remaining non-continuous dwell time.

18. The method of claim 11, further comprising assigning a priority value to each possible threat object.

19. The method of claim 18, further comprising determining the at least two threat objects from the plurality of possible threat objects based on the priority value.

* * * * *